United States Patent [19]

Biale

[11] Patent Number: 5,084,505
[45] Date of Patent: Jan. 28, 1992

[54] GLOSS LATEX PAINTS AND POLYMERIC COMPOSITIONS FOR USE THEREIN

[75] Inventor: John Biale, Anaheim, Calif.

[73] Assignee: Union Oil Company of California, Los Angeles, Calif.

[21] Appl. No.: 363,492

[22] Filed: Jun. 8, 1989

[51] Int. Cl.$^5$ .................. C08L 31/02; C08L 33/02
[52] U.S. Cl. .................. 524/555; 524/558; 524/560; 524/317
[58] Field of Search ........... 526/318.4; 524/560, 524/558, 555, 377

[56] References Cited

U.S. PATENT DOCUMENTS

| | | | |
|---|---|---|---|
| 3,630,984 | 12/1971 | Sheetz | 260/29.6 |
| 4,153,592 | 5/1979 | Burroway et al. | 526/318.4 |
| 4,233,198 | 11/1980 | Nolken | 260/29.6 |
| 4,492,780 | 1/1985 | Zimmerschied et al. | 524/45 |
| 4,617,230 | 10/1986 | Shah et al. | 428/288 |
| 4,713,412 | 12/1987 | Czerepinski et al. | 524/833 |

FOREIGN PATENT DOCUMENTS 1153140 8/1980 Canada .
0075529 9/1982 European Pat. Off. .
2091277 1/1982 United Kingdom .

OTHER PUBLICATIONS

Warson, Gloss Emulsion Paints, 2nd ed, Solihull Chemical Services, West Midlands, England (1983).
Simpson, Progress in Organic Coatings, 6:1-30 (1978).
Rhoplex HG-74, Rohm and Haas Company Trade Sales Flyer (1986).

Primary Examiner—Joseph L. Schofer
Assistant Examiner—Jeffrey T. Smith
Attorney, Agent, or Firm—Gregory F. Wirzbicki; Shlomo R. Frieman

[57] ABSTRACT

A polymeric composition comprising a polymer and less than about 1 weight percent surfactant is useful for producing a high-gloss latex paint. The polymer comprises about 25 to about 60 weight percent of a soft monomer whose homopolymer has a $T_g$ of less than about $-20°$ C. and about 40 to about 75 weight percent of a hard monomer whose homopolymer has a $T_g$ of greater than about 30° C., and has a calculated $T_g$ of about 15° to about 35° C., an actual $T_g$ of about 10° to about 60° C., and a particle size of less than about 250 nm.

32 Claims, 1 Drawing Sheet

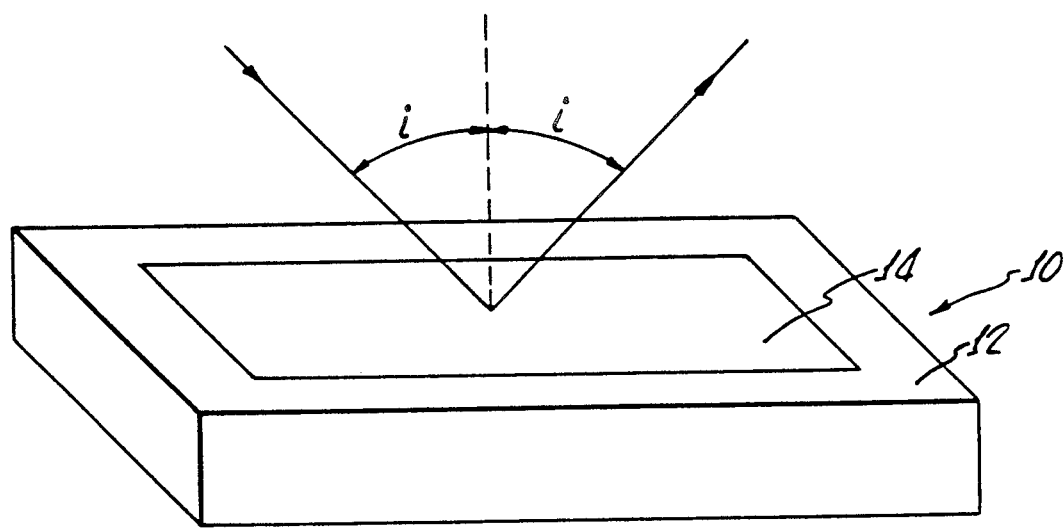

GLOSS LATEX PAINTS AND POLYMERIC COMPOSITIONS FOR USE THEREIN

BACKGROUND

The present invention relates to high-gloss latex paints, binders capable of producing high-gloss paints, and polymeric compositions for use in binders.

Paints can be divided into three basic categories, namely, (1) flat paints having a specular gloss of less than about 15 percent reflectance, (2) semi-gloss paints having a specular gloss of about 35 to about 50 percent reflectance, and (3) high-gloss paints having a specular gloss greater than about 70 percent reflectance based upon light having about a 60° angle of incidence. Oil-base paints can easily be formulated into these three categories of paints. However, it is difficult to formulate latex paints having a high specular gloss. The inability to readily formulate high-gloss latex paints is a significant drawback since oil-base paints are being phased out due to environmental restrictions limiting the volatile organic compounds (VOC) content of paints.

SUMMARY OF THE INVENTION

The present invention provides polymeric compositions that are used in the production of high-gloss latex paints. The polymeric compositions comprise a polymer and less than about 1 weight percent surfactant based on the total monomer weight in the polymer. The polymer comprises about 25 to about 60 weight percent soft monomer, and about 40 to about 75 weight percent hard monomer. As used in the specification and claims, the term "soft monomer" means a monomer whose homopolymer has a $T_g$ of less than about $-20°$ C., and the term "hard monomer" means a monomer whose homopolymer has a $T_g$ of greater than about 30° C. Generally, the polymers have a particle size of less than 250 nm. Optionally, a seed is present in the compositions. Some of the polymeric compositions exhibit an interesting phenomenon in that they have a theoretical or calculated glass transition temperature $(T_g)$ of about 15° to about 35° C. but exhibit an actual $T_g$ of about 10° to about 60° C.

The invention also encompasses an emulsion comprising water and at least one of the above polymeric compositions. In addition, the invention encompasses a paint. The emulsion is used as a binder in a high-gloss paint. Typically, the paint is of the type comprising (a) a coalescing aid, (b) a thickening aid, (c) a dispersing aid, (d) a defoamer, (e) a biocide, (f) a filler, and (g) the binder. When the paint is applied to a surface and dried, it forms a film capable of having a specular gloss of at least about 70 percent reflectance. Preferably, the paint has a pigment volume concentration (pvc) of less than about 25 volume percent (v/v%).

DRAWING

The high-gloss promoting characteristics of the polymeric compositions, and other features, aspects, and advantages of the present invention will become better understood with reference to the following description, appended claims, and accompanying drawing where the sole figure is a perspective view of a substrate having a surface coated with a film of the present invention.

DETAILED DESCRIPTION OF THE INVENTION

In accordance with the present invention, each polymeric composition comprises a polymer and less than about 1 weight percent surfactant. As used in the specification and the claims, "weight percent surfactant" is defined as the total dry weight of the surfactant(s) employed in making the polymer divided by the total weight of the monomers employed in making the polymer, this quotient being multiplied by 100%. Preferably the composition comprises less than about 0.5 weight percent surfactant. In general, when all other parameters are held constant, the lower the surfactant content of the polymer, the more insensitive the polymer is to water.

The surfactant is normally a copolymerizable surfactant, an anionic surfactant, a nonionic surfactant, or a mixture of two or more of these surfactants. Exemplary copolymerizable surfactants include, but are not limited to, sulfoethylmethacrylate, vinylsulfonate salts, sulfopropylmethacrylate, styrene sulfonate salts, 2-acrylamido-2-methylpropanesulfonic acid salts, and mixtures thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

The polymer generally comprises about 25 to about 60 weight percent of a soft monomer, and about 40 to about 75 weight percent of a hard monomer. Preferably, the polymer comprises about 30 to about 50 weight percent of the soft monomer and about 50 to about 70 weight percent of the hard monomer. More preferably, about 30 to about 45 weight percent of the soft monomer and about 55 to about 70 weight percent of the hard monomer are present in the polymer.

Typical soft monomers include, but are not limited to, non-functional acrylic monomers, vinylidene halide monomers, and alkylene monomers. As used in the specification and claims, the term "non-functional monomer" means a monomer that is devoid of any group, e.g., hydroxyl, carboxyl, amide, and amine, that can undergo further reaction after polymerization of the monomer. A mixture of soft monomers can also be employed in the polymer. Non-functional acrylic and vinylidene halide monomers are the preferred soft monomers.

The non-functional acrylic monomers have the formula I

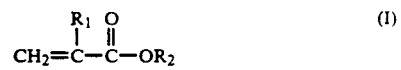

wherein $R_1$ is selected from the group consisting of hydrogen and methyl, and $R_2$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, ethyl acrylate, butyl acrylate, isobutyl acrylate, ethylhexyl acrylate, isodecyl methacrylate, lauryl methacrylate, tridecylmethacrylate. Butyl acrylate is the preferred soft, non-functional monomer.

If the soft monomer is vinylidene halide, the halide moiety is preferably selected from the group consisting of chlorine, bromine, and mixtures thereof. The preferred vinylidene halide monomer is vinylidene chloride. Illustrative soft alkylene monomers include, but are not limited to, isobutylene, ethylene, and propylene.

With respect to the hard monomer, the hard monomer is preferably selected from the group consisting of vinyl halide monomers, alkylene aromatic monomers, non-functional methacrylic monomers, acrylonitrile monomer, and vinyl acetate monomer. More preferably, the hard monomer is selected from the group consisting of alkylene aromatic monomers and non-functional methacrylic monomers.

When the hard monomer is vinyl halide, the halide moiety is preferably selected from the group consisting of chlorine, bromine, and mixtures thereof. Vinyl chloride is the preferred hard vinyl halide monomer.

As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula II

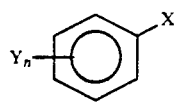
(II)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoxs, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. As used throughout the specification and claims, the term "organic radical" means any group containing at least one carbon atom, and the term "inorganic radical" means any group devoid of carbon atoms. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

With respect to non-functional methacrylic monomers, exemplary non-functional methacrylic monomers have the formula III

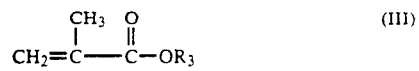
(III)

wherein $R_3$ is an alkyl group that preferably contains up to about 6 carbon atoms. Typical non-functional methacrylic monomers include methyl methacrylate, ethyl methacrylate, isobutyl methacrylate, and mixtures thereof.

Preferably, the polymeric composition also comprises at least one monomer selected from the group consisting of olefinic carboxylic acid monomers, functional acrylic monomers, ureido-containing monomers, acrylamide monomer, methacrylamide monomer, glycidyl acrylate monomer, and glycidyl methacrylate monomer. As used in the specification and claims, the term "functional monomers" means a monomer that contains at least one group, e.g., hydroxyl, carboxyl, amide, and amine, that can undergo further reaction after polymerization of the monomer.

Olefinic carboxylic acid monomers include both mono-olefinic carboxylic acid monomers and di-olefinic carboxylic acid monomers. Exemplary mono-olefinic carboxylic acids include, but are not limited to, acrylic acid, methacrylic acid, acryloxyacetic acid, methacryloxyacetic acid, acrylamidoglycolic acid, and mixtures thereof. Exemplary di-olefinic carboxylic acids include, but are not limited to, itaconic acid, fumaric acid, and mixtures thereof. The preferred olefinic carboxylic acid monomers are selected from the group consisting of acrylic acid, methacrylic acid, and mixtures thereof.

Functional acrylic monomers include hydroxyalkyl acrylate monomers having the formula IV

(IV)

and aminoalkyl acrylate monomers having the formula V

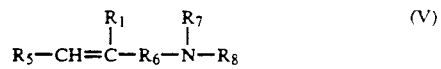
(V)

In formula IV, supra, $R_1$ is as defined above, and $R_4$ is a hydroxyalkyl group, preferably comprising up to about 6 carbon atoms. More preferably, the hydroxyalkyl group comprises up to 3 carbon atoms. Typical hydroxyalkyl acrylates include, but are not limited to, hydroxyethyl methacrylate, hydroxypropyl methacrylate, hydroxyethyl acrylate, hydroxypropyl acrylate, and mixtures thereof.

In formula V, supra, $R_1$ is as defined above, $R_5$ is selected from the group consisting of hydrogen and halogen, $R_6$ is a divalent alkyl radical containing 1 to about 5 carbon atoms, and $R_7$ and $R_8$ are each independently selected from the group consisting of hydrogen and alkyl radicals containing up to about 2 carbon atoms. Exemplary aminoalkyl acrylates include dimethylaminoethyl methacrylate, t-butylaminoethyl methacrylate, dimethylaminoethyl acrylate, t-butylaminoethyl acrylate, and mixtures thereof.

The aminoalkyl acrylate monomers of formula V, supra, and the ureido-containing amines are capable of enhancing the wet adhesion strength of a paint incorporating the polymer. An exemplary ureido-containing amine is 1-[2-(3-allyloxy-2-hydroxypropylamino)ethyl]imidazolidin-2-one, commercially known as Sipomer WAM brand monomer by Alcolac.

In one preferred version, the polymer comprises about 40 to about 75 weight percent alkenyl aromatic monomer (e.g., styrene) and/or non-functional methacrylic monomer (e.g., methyl methacrylate), up to about 10 weight percent hydroxyalkyl acrylate monomer (e.g., hydroxypropyl methacrylate), and up to about 5 weight percent olefinic carboxylic acid monomer (e.g., acrylic acid and/or methacrylic acid). In this version of the invention, the polymer more preferably comprises about 45 to about 65 weight percent alkenyl aromatic and/or non-functional methacrylic monomer, about 0.1 to about 10 weight percent hydroxyalkyl acrylate monomer, and about 0.1 to about 10 weight percent olefinic carboxylic acid monomer. Even more preferably, the polymer of this version of the invention comprises about 50 to about 60 weight percent alkenyl aromatic and/or non-functional methacrylic monomer, about 3 to about 7 weight percent hydroxyalkyl acrylate monomer, and about 1 to about 5 weight percent olefinic carboxylic acid monomer.

The polymer can optionally comprise a seed, generally having a particle size of about 25 to about 80 nm. An exemplary seed is comprised of styrene.

The polymers of the present invention generally have a particle size (i.e., a maximum cross-sectional diameter) of less than about 250 nm preferably, the particle size of the polymer is within the range of 90 to about 200 nm. When the polymer is comprised of a soft, non-functional acrylic monomer (e.g., butyl acrylate), an alkylene aromatic monomer (e.g., styrene), an hydroxyalkyl acrylate monomer (e.g., hydroxypropyl methacrylate), and an olefinic carboxylic acid monomer (e.g., methacrylic acid), the polymer preferably has a particle size of about 150 to about 200 nm. However, when the polymer is comprised of the soft, non-functional acrylic monomer (e.g., butyl acrylate), a methacrylic monomer (e.g., methyl methacrylate), a hydroxyalkyl acrylate monomer, and a olefinic carboxylic acid monomer, the polymer preferably has a particle size of about 90 to about 125 nm. Because small particle-sized polymers when incorporated into an emulsion make the emulsion more viscous and, therefore, more difficult to stabilize, it is preferred that the particle size be as large as possible without unduly sacrificing the composition's gloss enhancing capability.

An interesting phenomenon exhibited by some of the compositions of the present invention is that they have a theoretical $T_g$ of about 15° to about 35° C., but demonstrate an actual (and different) $T_g$ of about 10° to about 60° C. The theoretical $T_g$ of each composition is calculated by multiplying the weight percent of each constituent monomer by the $T_g$ of a homopolymer made from that monomer and adding all the resulting numerical products.

There are several ways of determining the actual $T_g$ of the compositions. For purposes of the present specification and claims, the actual $T_g$ is determined by differential scanning calorimetry (DSC).

The compositions of the present invention can be made, for example, by a delayed addition polymerization process and a pre-emulsion polymerization process.

Typically, the delay-addition polymerization process comprises forming a monomer mixture containing about 25 to about 60 weight percent of the soft monomer and about 40 to about 75 weight percent of the hard monomer. Water is added to a reactor and heated, generally to about 180° F., while preferably purging the reactor with an inert gas, such as nitrogen, to remove substantially all oxygen from the reactor. A catalyst is then added to the reactor. Preferably, a seed and/or a surfactant is also then added to the reactor. After the addition of the catalyst, the delay-addition of the monomer mixture is then commenced. The addition of the monomer mixture typically takes up to about 3 hours. Optionally, a portion, for example up to about ½ of the monomer mixture, can be added to the reactor at the beginning of the reaction along with the addition of the catalyst and/or seed and/or surfactant. Exemplary catalysts include, but are not limited to, t-butyl hydroperoxide, sodium persulfate, hydrogen peroxide, and mixtures thereof.

The pre-emulsion polymerization process for making the compositions of the present invention is similar to the delayed addition process with a major exception that a surfactant is also incorporated into the monomer mixture to form a pre-emulsion.

In another version of the delayed-add polymerization process, in addition to the monomer mixture feedstream, at least one additional monomer feedstream is also added to the reactor simultaneously during at least a portion of the time that the monomer mixture is added.

The polymerization processes yield an emulsion comprising the composition and water. However, as indicated in the above described processes, the emulsion can further comprise a surfactant, and a catalyst. Typically, the emulsion has a surface tension greater than about 45 dynes/cm, and preferably between about 45 and about 55 dynes/cm. In addition, the emulsion commonly contains at least about 45 weight percent solids. The solids content of the emulsion is generally within the range of about 45 to about 55 weight percent.

The emulsion is used as a binder in a water-base paint. A typical paint comprises a coalescing aid, a thickening aid, a dispersing aid, a defoamer, a biocide, a filler, and the binder. Coalescing aids, thickening aids, dispersing aids, defoamers, biocides, and fillers suitable for use in water-base paint are well known to those skilled in the art. Paints suitable for use in conjunction with the polymer generally have a pigment volume concentration (pvc) of less than about 25 volume by volume percent (v/v%). Preferably, the paint has a pvc of about 15 to about 25 v/v%.

As shown in the sole figure, the paint can be applied to at least a portion of a surface 12 of a substrate 10. When applied to a substrate 10 having a white glossy surface 12, the paint, upon drying forms a film 14 that typically has a specular gloss of at least about 70 percent reflectance when measured at an angle of incidence i of about 60°. A commercially available substrate having a white, glossy surface is Form WB grade plain white charts available from Leneta Company of Ho-Ho-Kus, New Jersey. Since specular gloss is directly proportioned to the percent reflectance at a given angle of incidence, it is preferred that the percent reflectance obtained by the film 14 be at least about 75, more preferably at least about 80, and even more preferably at least about 85. Accordingly, the composition of the instant invention is capable of enhancing the specular gloss of a paint.

EXAMPLES

The following examples demonstrate the preparation of exemplary polymeric compositions within the scope of the present invention as well as the specular gloss obtained by paints incorporating these compositions. However, the invention is not limited to the examples, but is defined by the claims.

EXAMPLES 1-5

Preparation of Polymeric Compositions

Monomer mixture having the compositions set forth in the following Table I were prepared:

TABLE I

| Example | Monomer, gm | | | | | |
|---|---|---|---|---|---|---|
| | BA[a] | ST[b] | MMA[c] | HPMA[d] | MAA[e] | AA[f] |
| 1 | 195 | 330 | — | 30 | 15 | — |
| 2 | 195 | 330 | — | 30 | — | 7.5 |
| 3 | 195 | 330 | — | 30 | — | 7.5 |
| 4 | 195 | — | 330 | 30 | 15 | — |
| 5 | 195 | — | 330 | 30 | — | 7.5 |

[a]BA denotes butyl acrylate.
[b]ST denotes styrene.
[c]MMA denotes methyl methacrylate.
[d]HPMA denotes hydroxypropyl methacrylate.
[e]MAA denotes methacrylic acid.
[f]AA denotes acrylic acid.

In each of Examples 1-5, the ingredient(s) listed in Table II below were added to a reactor and heated while purging the reactor with nitrogen.

TABLE II

| Example | Ingredients, gm | |
|---|---|---|
| | Water | Surfactant[g] |
| 1 | 550 | — |
| 2 | 550 | — |
| 3 | 550 | 7.5 |
| 4 | 550 | — |
| 5 | 550 | 7.5 |

[g]The surfactant was Alipal EP 110 brand anionic surfactant available from GAF.

When the contents of the reactor reached a temperature of about 180° F., the ingredient(s) given in Table III, infra, were individually added to the reactor.

TABLE III

| Example | Ingredients, gm | | |
|---|---|---|---|
| | Sodium Persulfate | SBAS[h] | SS[i] |
| 1 | 0.9 | 36 | — |
| 2 | 0.9 | — | 18 |
| 3 | 0.9 | — | — |
| 4 | 0.9 | 36 | — |
| 5 | 0.9 | — | — |

[h]SBAS denotes a styrene/butyl acrylate seed having a particle size of about 50 nm.
[i]SS denotes a styrene seed having a particle size of about 30 nm.

Next, the monomer mixture shown in the above Table I and the catalyst solution described in the following Table IV were separately added to the contents of the reactor over a period of about 3 hours while maintaining the temperature within the reactor at about 185° F.

TABLE IV

| Example | Ingredients, gm | | | |
|---|---|---|---|---|
| | Sodium Persulfate | Water | Surfactant[j] | Sodium Bicarbonate |
| 1 | 0.9 | 27 | 3.3 | — |

TABLE IV-continued

| Example | Ingredients, gm | | | |
|---|---|---|---|---|
| | Sodium Persulfate | Water | Surfactant[j] | Sodium Bicarbonate |
| 2 | 0.9 | 27 | 3.3 | — |
| 3 | 0.9 | 27 | 3.3 | — |
| 4 | 0.9 | 27 | 3.3 | — |
| 5 | 0.9 | 27 | 3.3 | 0.5 |

[j]The surfactant was Dowfax 2A1 brand anionic surfactant (45% active).

At the end of the 3 hour period, the contents of the reactor were neutralized with a solution of about 10% ammonium hydroxide to a pH of about 8.5.

EXAMPLE 6

A monomer mixture containing about 195 gm butyl acrylate, about 330 gm styrene, about 30 gm hydroxypropyl methacrylate, and about 15 gm methacrylic acid was prepared. Next, water was added to a reactor and the reactor was purged with nitrogen. A styrene/butyl acrylate seed (about 36 gm) and about ⅓ of the monomer mixture were then added to the reactor while continuing to purge the reactor with nitrogen. The contents of the reactor were then heated and when they reached a temperature of about 100° F., about 0.5 gm of sodium sulfoxylate formaldehyde in about 10 ml of water and about 1 gm of t-butyl hydroperoxide were added to the reactor. When the reactor's contents reached about 185° F., the remaining portion of the monomer mixture and a catalyst solution containing about 1.8 gm sodium persulfate, about 30 gm water, and about 1 gm Dowfax 2AI brand anionic surfactant (45% active) were added to the reactor over a period of about 2 hours while maintaining the temperature of the rector's contents at about 185° F. At the end of the two hour period, the contents of the reactor were neutralized to about 8.5 with a solution of about 10% ammonium hydroxide.

EXAMPLES 7-8

The monomer mixtures set forth in Table V, infra, were prepared.

TABLE V

| Example | Monomers, gm | | | |
|---|---|---|---|---|
| | BA | ST | MAA | EHA[k] |
| 7 | 195 | 360 | 15 | — |
| 8 | 126 | 330 | 15 | 126 |

[k]EHA denotes ethylhexyl acrylate.

In each of Examples 7 and 8, water in the amount stated in Table VI below was added to a reactor and heated while purging the reactor with nitrogen.

TABLE VI

| Example | Water, gm |
|---|---|
| 7 | 550 |
| 8 | 475 |

When the water in the reactor reached a temperature of about 180° F., the ingredients given in Table VII, infra, were individually added to the reactor.

TABLE VII

| Example | Ingredients, gm | | |
|---|---|---|---|
| | Sodium Persulfate | SBAS | SS |
| 7 | 0.9 | 36 | — |
| 8 | 0.9 | — | 18 |

Next, the monomer mixture shown in the above Table V and a catalyst solution (containing about 0.9 gm sodium persulfate, about 27 gm water, and about 3.3 gm Dowfax 2AI brand anionic surfactant [45% active]) were added to the reactor over a period of about 3 hours while maintaining the temperature within the reactor at about 185° F. At the middle of the reaction, the basic solution set forth in Table VIII was the added to the reactor over about the next 20 minutes followed by the addition of the monomeric system set forth in Table IX over the remaining portion of the reaction.

TABLE VIII

| Example | Basic Solution Ingredients, gm | |
|---|---|---|
| | Water | Ammonium Hydroxide |
| 7 | 25 | 10 |
| 8 | 25 | 6 |

TABLE IX

| Example | Monomeric System Ingredients, gm | |
|---|---|---|
| | Water | Sipomer WAM Monomer |
| 7 | 50 | 6 |
| 8 | 25 | 3 |

EXAMPLES 9-11

Monomer mixtures having the compositions set forth in the following Table X were prepared:

TABLE X

| Example | Monomer, gm | | | | | |
|---|---|---|---|---|---|---|
| | BA | ST | MMA | HPMA | MAA | AA |
| 9 | 195 | 330 | — | 30 | 7.5 | — |
| 10 | 195 | — | 330 | 30 | 7.5 | — |
| 11 | 195 | 360 | — | — | — | 7.5 |

In each of Examples 9-11, the ingredient(s) listed in Table XI below were added to a reactor and heated while purging the reactor with nitrogen.

TABLE XI

| Example | Ingredients, gm | |
|---|---|---|
| | Water | Surfactant[g] |
| 9 | 500 | 4 |
| 10 | 500 | 0.4 |
| 11 | 500 | — |

[g]The surfactant was Alipal EP 110 brand anionic surfactant available from GAF.

In Example 9: when the contents of the reactor reached a temperature of about 160° F., 0.9 gm sodium persulfate was added to the reactor. Next, the monomer mixture shown in the above Table X for Example 9, an emulsion comprising about 50 gm water, about 9 gm acrylamide, and about 5.6 gm Alipal C0436 brand anionic surfactant (available from GAF), and a catalyst solution comprising about 0.9 gm sodium persulfate and 27 gm water were separately added to the contents of the reactor over a period of about 3 hours while maintaining the temperature within the reactor at about 165° F. At the end of the 3 hour period, an ammonium hydroxide solution containing about 6 gm ammonium hydroxide and about 20 gm water was slowly added to the contents of the reactor and then the reactor's contents were neutralized to a pH of about 8.5 with a solution of about 10% ammonium hydroxide.

In the case of Example 10, when the contents of the reactor reached a temperature of about 180° F., 0.9 gm sodium persulfate was added to the reactor. Next, the monomer mixture shown in the above Table X for Example 10, an emulsion comprising about 50 gm water, about 9 gm acrylamide, and about 5.6 gm Alipal C0436 brand anionic surfactant (available from GAF), and a catalyst solution comprising about 0.9 gm sodium persulfate and 27 gm water were separately added to the contents of the reactor over a period of about 3 hours while maintaining the temperature within the reactor at about 185° F. At the end of the 3 hour period, an ammonium hydroxide solution containing about 5 gm ammonium and about 20 gm water was slowly added to the contents of the reactor and then the reactor's contents were neutralized to a pH of about 8.5 with a solution of about 10% ammonium hydroxide.

With respect to Example 11, when the contents of the reactor reached a temperature of about 180° F., 0.9 gm sodium persulfate and about 36 gm of a styrene/butyl acrylate seed having a particle size of about 50nm were individually added to the reactor. Next, the monomer mixture shown in the above Table X for Example 11, a solution comprising about 50 gm water and about 9 gm acrylamide, and a catalyst solution comprising about 0.9 gm sodium persulfate and 27 gm water were separately added to the contents of the reactor over a period of about 3 hours while maintaining the temperature within the reactor at about 185° F. At the end of the 3 hour period, the reactor's contents were neutralized to a pH of about 8.5 with a solution of about 10% ammonium hydroxide.

EXAMPLE 12

Water (about 350 gm) and Alipal 110 brand anionic surfactant (about 5.6 gm) were charged to a reactor and heated. When the contents of the reactor reached about 180° F., sodium persulfate (about 0.9 gm) was added to the reactor. Next, a monomer mixture containing about 195 gm butyl acrylate, about 330 gm styrene, about 30 gm hydroxypropyl methacrylate, and about 7.5 gm acrylic acid and a pre-emulsion containing about 200 gm water and about 1.9 gm Alipal C0436 brand anionic surfactant were combined with mixing. The resulting combination was added to the reactor over a period of about 3 hours while maintaining the temperature of the reactor at about 185° F. At the end of the 3 hour period, the contents of the reactor were neutralized to a pH of about 8.5 with a solution of about 10% ammonium hydroxide.

The emulsions prepared in Examples 1-12 had the properties listed in the following Table XII:

TABLE XII

| Example | Total Solids, Percent | Particle Size, nm | Viscosity, cps |
|---|---|---|---|
| 1 | 49.1 | 165 | 175 |
| 2 | 48.8 | 123 | 430 |
| 3 | 46 | 91 | 620 |
| 4 | 49.1 | 174 | 70 |
| 5 | 48.8 | 95 | 2200 |
| 6 | 48.2 | 172 | 125 |
| 7 | 48.4 | 192 | 30 |
| 8 | 49.2 | 198 | 130 |
| 9 | 48.5 | 107 | 2000 |
| 10 | 45.0 | 93 | 830 |
| 11 | 49.1 | 181 | 370 |
| 12 | 46.2 | 100 | 425 |

EXAMPLES 13-24

The gloss of a paint formulation using as a binder each of the emulsions prepared in Examples 1-12 was determined as follows.

Preparation of Paste

A paste was prepared by combining methyl carbitol, Tamol 731 brand dispersing aid (25% active; available from Rohm and Haas Co.), Triton CF-10 brand surfactant (available from Rohm and Haas Co.), Foamaster AP brand defoamer (available from Diamond Shamrock Corp.), titanium dioxide, and water in the proportions set forth in Table XIII below.

TABLE XIII

| Materials | Weight, lbs | Volume, gallons |
| --- | --- | --- |
| Methyl Cabitol | 45.0 | 5.29 |
| Tamol 731 | 7.9 | 0.86 |
| Triton CF-10 | 1.8 | 0.20 |
| Foamaster AP | 2.0 | 0.26 |
| Titanium Dioxide | 190.0 | 5.64 |
| Water | 11.3 | 1.35 |

The combination of materials listed in Table XIII were ground at a high speed to a National Standard Rating of about 7. Next, water and a Dowicil brand biocide (available from Dow Chemical Co.) in the proportions stated in Table XIV were added to the ground mixture.

TABLE XIV

| Materials | Weight, lbs | Volume, gallons |
| --- | --- | --- |
| Water | 97.3 | 11.67 |
| Dowicil:Water (1:5) | 8.0 | 0.96 |

The pH of the resulting slurry was adjusted to between about 8.3 and about 8.5 with ammonium hydroxide. Afterwards, a premix of Acrysol RM-5 brand rheology modifier (available from Rohm and Haas Co.), water, and a 28% ammonium hydroxide solution in the proportions shown in Table XV was added to the pH adjusted slurry to form the paste.

TABLE XV

| Materials | Weight, lbs | Volume, gallons |
| --- | --- | --- |
| Acrysol RM-5 | 20.0 | 2.27 |
| Water | 28.2 | 3.38 |
| Ammonium Hydroxide, 28% Solution | 2 | 0.24 |

The final pH of the paste was adjusted to be about 8.5.

Preparation of Paint

A paint was prepared by mixing about 168.6 gm of the above paste, about 14.0 gm of Texanol brand coalescing aid (available from Eastman Chemicals), one of the latex emulsions prepared in Examples 1-12, and water, the amount of latex emulsion and water being selected so as to provide about 85.34 gm dry latex in the final paint formulation.

A wet coating of each paint formulation was applied to a Form WB grade plain white chart (available from Leneta Company) and drawn down using a 6 mil Bird applicator. The coating was dried in a constant temperature and constant humidity room for at least 3 days. The specular gloss of each coating was measured using a gloss meter set at 20° and 60°. The readings were recorded and are set forth in Table XVI, infra.

TABLE XVI

| Paint Formulation Using Emulsion Of Example | 60° Gloss, Percent Reflectance | 20° Gloss, Percent Reflectance |
| --- | --- | --- |
| 1 | 86 | 54 |
| 2 | 85 | 49 |
| 3 | 86 | 48 |
| 4 | 77 | 45 |
| 5 | 80 | 47 |
| 6 | 84 | 46 |
| 7 | 84 | 48 |
| 8 | 84 | 43 |
| 9 | 88 | 50 |
| 10 | 83 | 52 |
| 11 | 86 | 50 |
| 12 | 84 | 47 |

All of the paint formulations of Examples 1 to 12 contain a binder that comprises a polymeric composition within the scope of the present invention. Accordingly, as evidenced by the data shown in Table XVI, paint formulations which use binders that contain the polymeric compositions of the present invention are high-gloss latex paints.

Although the present invention has been described in considerable detail with reference to certain preferred versions thereof, other versions are possible. For example, the paint can include one or more ingredients that enhance other paint properties. Therefore, the spirit and scope of the appended claims should not necessarily be limited to the description of the preferred embodiments contained herein.

What is claimed is:

1. A polymeric composition comprising a polymer, at least about 45 weight percent solids, and less than 0.5 weight percent surfactant and having a calculated $T_g$ of 15° to about 35° C., the polymer having a particle size of about 90 nm to about 250 nm and comprising:
    (a) about 25 to about 60 weight percent of a soft monomer whose homopolymer has a $T_g$ of less than about $-20°$ C.; and
    (b) about 40 to about 75 weight percent of a hard monomer whose homopolymer has a $T_g$ of greater than about 30° C.

2. The composition of claim 1 wherein the polymer comprises about 30 to about 50 weight percent of the soft monomer and about 50 to about 70 weight percent of the hard monomer.

3. The composition of claim 1 wherein the soft monomer is selected from the group consisting of non-functional acrylic monomers, vinylidene halide monomers, alkylene monomers, glycidyl acrylate monomer, and mixtures thereof.

4. The composition of claim 1 wherein the soft monomer is a non-functional acrylic monomer having the formula

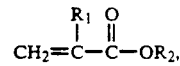

wherein $R_1$ is selected from the group consisting of hydrogen and methyl, and $R_2$ is an alkyl group.

5. The composition of claim 4 wherein $R_2$ contains up to about 15 carbon atoms.

6. The composition of claim 1 wherein the soft monomer is selected from the group consisting of ethyl acrylate, butyl acrylate, isobutyl acrylate, ethylhexyl acrylate, isodecylmethacrylate, lauryl methacrylate, tridecyl methacrylate, and mixtures thereof.

7. The composition of claim 1 wherein the soft monomer is butyl acrylate.

8. The composition of claim 1 wherein the hard monomer is selected from the group consisting of vinyl halide monomers, alkenyl aromatic monomers, non-functional methacrylic monomers, acrylonitrile monomer, vinyl acetate monomer, and mixtures thereof.

9. The composition of claim 1 wherein the hard monomer is selected from the group consisting of alkenyl aromatic monomers, non-functional methacrylic monomers, and mixtures thereof.

10. The composition of claim 1 wherein the hard monomer is a non-functional methacrylic monomer having the formula

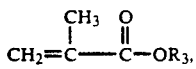

wherein $R_3$ is an alkyl group.

11. The composition of claim 1 having an actual $T_g$ of about 10° to about 60° C.

12. The composition of claim 1 further comprising at least one monomer selected from the group consisting of olefinic carboxylic acid monomers, ureido-containing amine monomers, functional acrylic monomers, acrylamide monomer, methacrylamide monomer, and mixtures thereof.

13. The composition of claim 1 further comprising at least one monomer selected from the group consisting of olefinic carboxylic acid monomers, functional acrylic monomers, and mixtures thereof.

14. The composition of claim 1 further comprising an olefinic carboxylic acid monomer selected from the group consisting of mono- and di-olefinic carboxylic acids, and mixtures thereof.

15. The composition of claim 1 further comprising an olefinic carboxylic acid monomer selected from the group consisting of acrylic acid, methacrylic acid, acryloxyacetic acid, methacryloxyacetic acid, acrylamidoglycolic acid, itaconic acid, fumaric acid, and mixtures thereof.

16. The composition of claim 1 further comprising an olefinic carboxylic acid monomer selected from the group consisting of acrylic acid, methacrylic acid, and mixtures thereof.

17. The composition of claim 1 further comprising an ureido-containing amine monomer.

18. The composition of claim 1 further comprising 1-[2-(3-allyloxy-2-hydroxypropylamino)-ethyl]imidazolidin-2-one.

19. The composition of claim 1 wherein the polymer has a particle size of about 90 to about 200 nm.

20. The composition of claim 1 wherein the polymer has a particle size of about 150 to about 200 nm.

21. A polymeric composition comprising a polymer, at least about 45 weight percent solids, and less than 0.5 weight percent surfactant and having a calculated $T_g$ of 15° to about 35° C., the polymer having a particle size of about 90 nm to about 250 nm and comprising:

(a) about 25 to about 60 weight percent of a soft monomer whose homopolymer has a $T_g$ of less than about −20° C., the soft monomer being selected from the group consisting of non-functional acrylic monomers, vinylidene halide monomers, alkylene monomers, glycidyl acrylate monomer, and mixtures thereof; and (b) about 40 to about 75 weight percent of a hard monomer whose homopolymer has a $T_g$ of greater than about 30° C., the hard monomer being selected from the group consisting of vinyl halide monomers, alkenyl aromatic monomers, non-functional methacrylic monomers, acrylonitrile monomer, vinyl acetate monomer, and mixtures thereof.

22. The composition of claim 21 wherein the composition comprises less than about 0.5 weight percent surfactant and has an actual and different $T_g$ of about 10° to about 60° C., and the polymer comprises about 30 to about 50 weight percent of the soft monomer and about 50 to about 70 weight percent of the hard monomer.

23. The composition of claim 21 wherein the soft monomer is a non-functional acrylic monomer having the formula

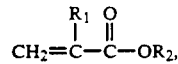

wherein $R_1$ is selected from the group consisting of hydrogen and methyl, and $R_2$ is an alkyl group; and the hard monomer is selected from the group consisting of:

(i) alkenyl aromatic monomers having the formula

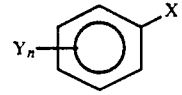

wherein X is an aliphatic radical containing at least one alkenyl bond, Y is a substituent on the aromatic ring, and n is an integer from 0 to 5;

(ii) non-functional methacrylic monomers having the formula

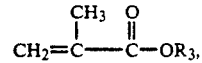

wherein $R_3$ is an alkyl group; and
(iii) mixtures of (i) and (ii).

24. The composition of claim 21 wherein soft monomer is selected from the group consisting of ethyl acrylate, butyl acrylate, isobutyl acrylate, ethylhexyl acrylate, isodecyl methacrylate, lauryl methacrylate, tridecyl methacrylate, and mixtures thereof; and the hard monomer is selected from the group consisting of styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, methyl methacrylate, ethyl methacrylate, isobutyl methacrylate, and mixtures thereof.

25. The composition of claim 24 wherein the composition comprises less than about 0.5 weight percent surfactant and has an actual and different $T_g$ of about 10° to about 60° C., and the polymer comprises about 30 to about 50 weight percent of the soft monomer and about 50 to about 70 weight percent of the hard monomer.

26. The composition of claim 21 wherein soft monomer is butyl acrylate; and the hard monomer is selected from the group consisting of styrene, methyl methacrylate, and mixtures thereof.

27. The composition of claim 21 further comprising at least one monomer selected from the group consisting of olefinic carboxylic acid monomers, ureido-containing amine monomers, functional acrylic monomers, acrylamide monomer, methacrylamide monomer, and mixtures thereof.

28. The composition of claim 27 wherein the composition comprises less than about 0.5 weight percent surfactant and has an actual and different $T_g$ of about 10° to about 60° C., and the polymer comprises about 30 to about 50 weight percent of the soft monomer and about 50 to about 70 weight percent of the hard monomer.

29. The composition of claim 21 further comprising at least one monomer selected from the group consisting of:
(i) olefinic carboxylic acid monomers selected from the group consisting of acrylic acid, methacrylic acid, acryloxyacetic acid, methacryloxyacetic acid, acrylamidoglycolic acid, itaconic acid, fumaric acid, and mixtures thereof;
(ii) ureido-containing amine monomers;
(iii) functional acrylic monomers selected from the group consisting of hydroxyalkyl acrylate monomers, aminoalkyl acrylate monomers, and mixtures thereof;
(iv) acrylamide monomer;
(v) methacrylamide monomer; and
(vi) mixtures of (i), (ii), (iii), (iv), and (v).

30. The composition of claim 21 further comprising at least one monomer selected from the group consisting of acrylic acid, methacrylic acid, hydroxyethyl methacrylate, hydroxypropyl methacrylate, hydroxyethyl acrylate, hydroxypropyl acrylate, t-butylaminoethyl methacrylate, dimethylaminoethyl methacrylate, t-butylaminoethyl acrylate, dimethylaminoethyl acrylate, 1-[2-(3-allyloxy-2-hydroxypropylamino)-ethyl-]imidazolidin-2-one, and mixtures thereof.

31. The composition of claim 21 wherein the polymer has a particle size of about 90 to about 200 nm.

32. The composition of claim 21 wherein the polymer has a particle size of about 150 to about 200 nm.

* * * * *